United States Patent [19]

Yamamoto et al.

[11] 4,399,327
[45] Aug. 16, 1983

[54] VARIABLE DIRECTIONAL MICROPHONE SYSTEM

[75] Inventors: Makoto Yamamoto; Naotaka Miyaji; Yukinobu Ishigaki; Kaoru Totsuka, all of Yokohama, Japan

[73] Assignee: Victor Company of Japan, Limited, Yokohama, Japan

[21] Appl. No.: 227,924

[22] Filed: Jan. 23, 1981

[30] Foreign Application Priority Data

Jan. 25, 1980 [JP] Japan .................................. 55-7568
Feb. 19, 1980 [JP] Japan ................................ 55-19601

[51] Int. Cl.$^3$ ............................................. G03B 31/00
[52] U.S. Cl. ............................ 179/1 DM; 179/121 D; 352/25
[58] Field of Search .............. 179/1 DM, 179, 121 D; 352/11, 25, 26

[56] References Cited

U.S. PATENT DOCUMENTS

| | | | |
|---|---|---|---|
| 3,403,223 | 9/1968 | Kleis | 179/1 DM |
| 3,483,324 | 12/1969 | Görike | 179/1 DM |
| 3,793,489 | 2/1974 | Sank | 179/1 DM |
| 4,308,425 | 12/1981 | Momose | 179/1 DM |
| 4,334,740 | 6/1982 | Wray | 179/1 DM |

FOREIGN PATENT DOCUMENTS

2066620 6/1981 United Kingdom ........... 179/1 DM

OTHER PUBLICATIONS

"Zoom Mikrofon", *Funkschau*, vol. 52, No. 19, (Sep. 1980), pp. 79-80.

*Primary Examiner*—G. Z. Rubinson
*Assistant Examiner*—L. C. Schroeder
*Attorney, Agent, or Firm*—Lowe, King, Price & Becker

[57] ABSTRACT

Three microphone units of first order sound pressure gradient unidirectional type are disposed in a casing having front and rear portions at both sides in such a manner that the center axes of the microphone units are aligned on the same axis. Two among the three microphone units are arranged to face the front portion of the casing, and remaining one microphone unit is arranged to face the rear portion of the casing. The output signals of the three microphone units are combined at a variable ratio so that the directivity of the microphone system can widely vary from nondirectivity via first order sound pressure gradient unidirectivity to second order sound pressure gradient unidirectivity. The output signals of two microphone units used for obtaining second order sound pressure gradient unidirectivity may be respectively applied to high pass filters before being combined, and the combined signal is fed to an equalizer. If an equalizer having modified frequency characteristic is employed, such high pass filters may be omitted.

18 Claims, 24 Drawing Figures

VARIABLE DIRECTIONAL MICROPHONE SYSTEM

FIELD OF THE INVENTION

This invention generally relates to a microphone system responsive to sound waves to emit equivalent electric waves, and more particularly, the present invention relates to a microphone system having a variable directivity, which is useful when used with a movie camera or a VTR camera.

BACKGROUND OF THE INVENTION

Recently, so called live recording of sound has become very popular amoung amateurs, and since movie cameras and VTR (video tape recorder) cameras have also become popular, it is now desired to perform sound recording corresponding to the pictures of the camera. Namely, it is desired to catch only an objective sound rejecting other sound and improving signal to noise (S/N) ratio and sound clarity. In other word, it has been desired to develop a variable directional microphone system which is capable of receiving sound waves in accordance with the zooming operation of the movie or VTR camera.

Apart from such a microphone for use with a movie or VTR camera, it is convenient if a microphone for a customary tape recorder used for recording conversations in a conference or the like, has a variable directivity because voices of all persons in the conference can be recorded with a sufficient recording level by adjusting the directivity of the microphone depending on the distance between the microphone and the speaker.

To meet the above-mentioned requirement of a variable directional microphone one of the inventors of the present invention (in collaboration with other inventors) has already disclosed a variable directional microphone system in a Japanese Patent Application No. 54-41691 (corresponding U.S. application Ser. No. 142,845, now U.S. Pat. No. 4,308,425, and German application No. P3016018.0). The microphone system disclosed therein comprises three first order sound pressure gradient unidirectional microphones. As will be described with reference to the drawings, in the arrangement of the previously disclosed varible directional microphone system, two microphone units are arranged to face one direction on the same axis, while the remaining one microphone unit is arranged in the opposite direction where the diaphragm of the oppositely directed microphone unit and the diaphragm of one of the frontward directed microphone are in the same plane. These three microphone units are fixedly disposed in a casing arranged to allow sound waves from all directions to pass therethrough. Since the center axis of the oppositely directed microphone unit is spaced from the common center axis of the two frontward directed microphone units, the inner diameter of the casing has to be large enough to be able to contain all three microphone units therein. As a result, the already disclosed microphone system is too bulky to be mounted on a movie or VTR camera. Furthermore, since the already disclosed microphone system is large in size, it is heavy and is difficult to handle.

It has been already disclosed in the above-mentioned patent applications that the output signals of the three microphone units are combined where the combining ratio therebetween is suitably adjusted by means of ganged variable resistors. With this arrangement the proposed microphone system is capable of changing its directivity from nondirectivity or omnidirectivity via first order sound pressure gradient unidirectivity to second order sound pressure gradient unidirectivity. However, when the combining ratio is adjusted so that the microphone systen exhibits second order sound pressure gradient unidirectivity, noise in a low frequency range increases and the system is poor at wind noises because the level of low frequency components of the combined output signal is greatly amplified by an equalizer.

Furthermore, two microphone units, which are used for obtaining second order sound pressure gradient unidirectivity among the above-mentioned three microphone units, must be equal or close to each other in frequency characteristics and directivities in order to obtain desired second order sound pressure gradient unidirectivity in the above-mentioned disclosed parrangement. This means that selection of microphone units with respect to frequency characteristics and directivities has to be performed with high precision, and thus the disclosed arrangement requires a high cost in manufacturing.

SUMMARY OF THE INVENTION

It is, therefore, an object of the present invention to provide a variable directional microphone system which is small in size and is light in weight.

According to a feature of the present invention two or three microphone units of first order sound pressure gradient unidirectional type are fixedly disposed in a casing arranged to allow sound waves from all directions to pass therethrough, where the output signals of the microphone units are combined at a variable ratio. When two microphone units are oppositely arranged in the casing, the directivity of the microphone system can be changed from nondirectivity to first order sound pressure gradient unidirectivity by changing the combining ratio of the output signals of the microphone units. When a third microphone unit is additionally provided to the above arrangement, the directivity can be widely changed from nondirectivity via first order sound pressure gradient unidirectivity to second order sound pressure gradient unidirectivity by changing the combining ratio of the output signals of the three microphone units.

According to another feature of the present invention the frequency characteristics of the output signals of two microphone units used for obtaining second order sound pressure gradient unidirectivity are modified to lower the level of output signals of low frequency range. This may be done by using two high pass filters prior to combining the output signals or by an equalizer whose frequency characteristic has been modified from an original equilizer characteristic, which equalizer follows a combiner responsive to the output signals of the two microphone units.

In accordance with the present invention there is provided a variable directional microphone system comprising: (a) a casing having front and rear portions at both sides, said casing being arranged to allow sound waves from all directions to pass therethrough; (b) a first microphone unit of first order sound pressure gradient unidirectional type, disposed in said casing in such a direction that the front of said first microphone unit is oriented toward said front portion of said casing; (c) a second microphone unit of first order sound pressure gradient unidirectional type, disposed in said casing in such a direction that the front of said second microphone unit is oriented toward said rear portion of said casing, said second microphone unit being arranged in such a manner that the rear of said microphone unit faces the rear of said first microphone unit, said first and second microphone units respectively having first and second center axes which respectively pass through the centers of the fronts and rears of said first and second microphone units, said first and second axes being aligned on the same axis; and (d) means for combining the output signals of said first and second microphone units at a variable ratio.

In accordance with the present invention there is also provided a variable directional microphone system comprising: (a) a casing having front and rear portions at both sides, said casing being arranged to allow sound waves from all directions to pass therethrough; (b) a first microphone unit of first order sound pressure gradient unidirectional type, disposed in said casing in such a direction that the front of said first microphone unit is oriented toward said front portion of casing; (c) a second microphone unit of first order sound pressure gradient unidirectional type, disposed in said casing in such a direction that the front of said second microphone unit is oriented toward said rear portion of said casing, said second microphone unit being arranged in such a manner that the rear of said second microphone unit faces the rear of said first microphone unit; (d) a third microphone unit of first order sound pressure sound pressure gradient unidirectional type, disposed in said casing in such a direction that the front of said third microphone unit is oriented toward said front portion, said first, second and third microphone units respectively having first, second and third axes which respectively pass through the centers of the fronts and rears of said first, second and third microphone units, said first, second and third axes being aligned on the same axis; and (e) means for combining the output signals of said first, second and third microphone units at a variable ratio.

In accordance with the present invention there is further provided a second order sound pressure gradient unidirectional microphone system comprising: (a) a casing having front and rear portions at both sides, said casing being arranged to allow sound waves from all directions to pass therethrough; (b) a first microphone unit of first order sound pressure gradient unidirectional type, disposed in said casing in such a direction that the front of said first microphone unit is oriented toward said front portion of said casing; (c) a second microphone unit of first order sound pressure gradient unidirectional type, disposed in said casing in such a direction that the front of said second microphone unit is oriented toward said front portion of said casing, said second microphone unit being located in the rear of said first microphone unit; (d) means for combining the output signals of said first and second microphone units at a given ratio; (e) first and second high pass filters respectively interposed between said first microphone unit and said means for combining, and between said second microphone unit and said means for combining; and (f) an equalizer responsive to the output signal of said means for combining, said equalizer having a frequency characteristic so that the level of low frequency components of the combined signal is raised at a given rate per octave.

In accordance with the present invention there is further provided a second order sound pressure gradient unidirectional microphone system comprising; (a) a casing having front and rear portions at both sides, said casing being arranged to allow sound waves from all directions to pass therethrough; (b) a first microphone unit of first order sound pressure gradient unidirectional type, disposed in said casing in such a direction that the front of said first microphone unit is oriented toward said front portion of said casing; (c) a second microphone unit of first order sound pressure gradient unidirectional type, disposed in said casing in such a direction that the front of said second microphone unit is oriented toward said front portion of said casing, said second microphone unit being located in the rear of said first microphone unit; (d) means for combining the output signals of said first and second microphone units at a given ratio; and (e) an equalizer responsive to the output signal of said means for combining, said equalizer having a frequency characteristic so that the level of low frequency components of the combined signal is raised by a constant amount, and the level of middle frequency components of the combined signal is raised at a given rate per octave.

BRIEF DESCRIPTION OF THE DRAWINGS

The object and features and other features of the present invention will be more readily apparent from the following detailed description of the preferred embodiments of the invention taken in conjunction with the accompanying drawings in which.

DETAILED DESCRIPTION OF THE PREFERRED EMBODIMENTS

Prior to describing the preferred embodiments of the present invention, the structure of the above-mentioned already disclosed variable directional microphone system will be described for a better understanding of the features of the present invention. In the following description, first order sound pressure gradient unidirectivity and second order sound pressure gradient unidirectivity are respectively referred to as first order unidirectivity and second order unidirectivity for simplicity.

Figures 1, 2:
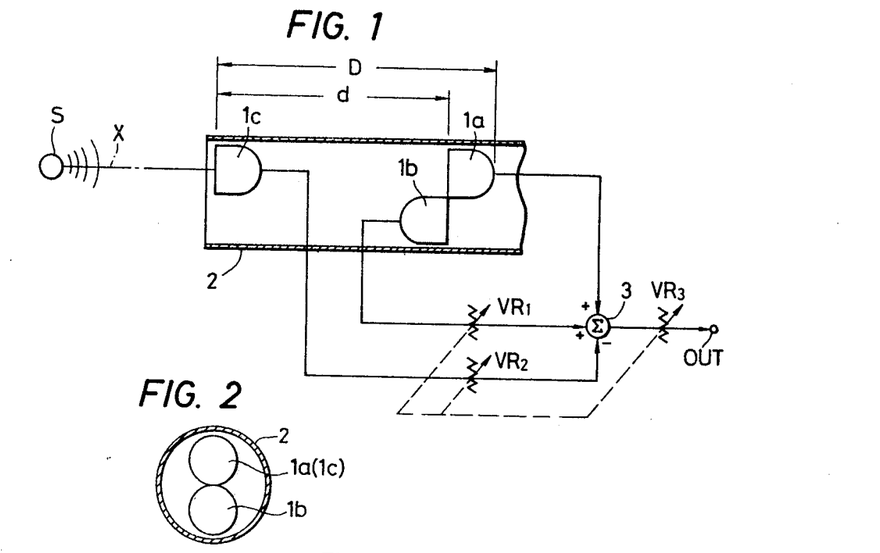
FIG. 1 is a schematic view of a variable directional microphone system already disclosed in the above-mentioned prior applications.
FIG. 2 is a schematic cross-sectional front view of the microphone unit casing of the variable directional microphone system of FIG. 1.

FIG. 1 illustrates a schematic view of the above-mentioned variable directional microphone system already disclosed by the inventors of the present invention prior to the present invention. Two first order unidirectional microphone units $1a$ and $1c$ are arranged frontward with respect to a sound source S on an axis X with a distance d therebetween while a first order unidirectional microphone unit $1b$ is arranged backward with respect to the sound source S in such a manner that the diaphragm thereof is placed in the same plane in which the diaphragm of the microphone unit $1a$ is placed, and these microphone units $1a$, $1b$ and $1c$ are fixed by means of suitable members in a microphone casing 2. In the above, the outer diameters of the microphone units $1a$ to $1c$ are equal to each other. For instance, in the case of obtaining nondirectivity, ganged variable resistors $VR_1$ and $VR_2$ are adjusted so that the output level of the microphone unit $1b$ is at a maximum and the output level of the microphone unit $1c$ is at a minimum, and then the output signal of the microphone unit $1a$ and the output signal of the microphone unit $1b$ are added to each other by a combiner 3 to derive an output signal from an output terminal OUT after the level thereof is adjusted by a variable resistor $VR_3$. On the other hand, in the case of obtaining first order unidirectivity, adjustment is performed so that both the output levels of the microphone units $1b$ and $1c$ are minimum, and thus only the output of the microphone unit $1a$ is derived. Futhermore, in case of obtaining second order unidirectivity, adjustment is performed so that the output level of the microphone unit $1b$ is minumum, and the output level of the microphone unit $1c$ is maximum, and then the output signal of the microphone $1c$ is subtracted from the output signal of the microphone unit $1a$ to derive an output signal from the output terminal OUT. This microphone system of FIG. 1 is capable of changing its directivity in a wide range when compared to a conventional arrangement in which two microphone units are combined to exhibit directivity varying from nondirectivity to first order unidirectivity and bidirectivity. Thus, the system of FIG. 1 is capable of sound image zooming with a sufficient feeling of distance.

Figure 6:
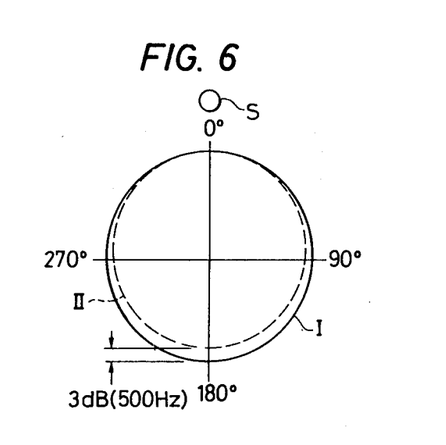
FIG. 6 is a graphical representation of a theoretical nondirectivity of a microphone system and and actually measured nondirectivity of the variable microphone system according to the present invention.

With the arrangement of the above-described microphone system, a theoretically accurate nondirectional pattern having no distortion can be obtained. However, since the diaphragms of the microphone units $1a$ and $1b$ are in the same plane, namely, the axes of the microphone units $1a$ and $1b$ are separated from each other, it is inevitable that the outer diameter of the microphone system becomes large. Specifically as shown in FIG. 2, the inner diameter of the microphone casing 2 has to be equal to or greater than the sum of the diameter of the microphone unit $1a$ and the diameter of the microphone unit $1b$, raising a problem that the casing is too bulky when used as an attached microphone to be mounted on a television camera or an eight-millimeter movie camera.

The present invention has resolved the above-mentioned problem, and the embodiments thereof will be described with reference to the accompanying drawings hereinbelow.

Figure 3:
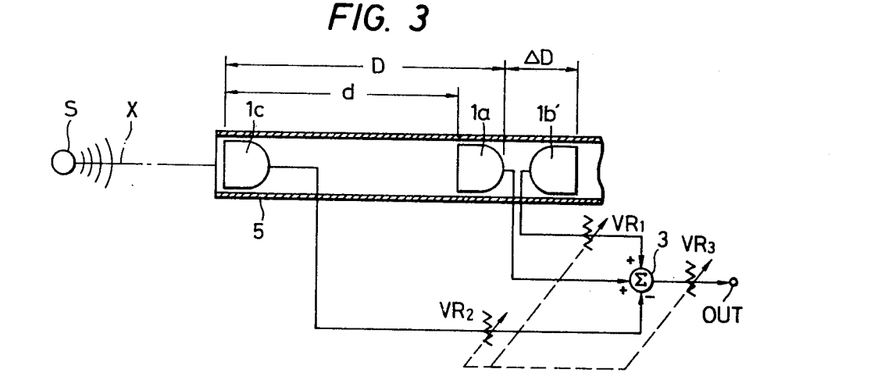
FIG. 3 is a schematic view of a first embodiment of the variable directional microphone system according to the present invention.

FIG. 3 shows a schematic view of a first embodiment of the variable directional microphone system according to the present invention, and in FIG. 3, the same elements as in FIG. 1 are designated by the same numerals or the same references. Three unidirectional microphone units $1a$, $1b'$ and $1c$ are arranged in a casing 5 in such a manner that the center axes of these microphone units $1a$, $1b'$ and $1c$ are aligned on the same axis X which extends toward the sound source S. In the above, the center axis of each microphone unit is assumed to pass through the center of the front and the center of the rear of the microphone unit. The casing 5 is arranged to allow sound waves from all direction to pass therethrough, and has front and rear portions at both sides thereof. It is assumed, as shown in FIG. 3, that the front portion of the casing is oriented toward the sound source S. Two microphone units $1a$ and $1c$ among the above-mentioned three microphone units are arranged to face the front portion of the casing 5, while the remaining microphone unit $1b'$ is arranged to face the rear portion of the casing 5. In other words, the microphone unit $1b'$ is arranged backward with respect to the sound source S. The frontward arranged microphone units $1a$ and $1c$ are spaced by a given distance d in the same manner as in FIG. 1, and the microphone unit $1b'$ is located in the rear of the microphone unit 1a. The diaphragm of the microphone unit 1b' is spaced from the rear surface of the microphone 1a by a distance expressed in terms of ΔD. All three microphone units 1a, 1b' and 1c are fixedly supported by suitable supporting means (not shown) in the casing 5. Here, it is assumed that the outer diameters of the microphone units 1a, 1b' and 1c are equal to each other. A suitable combinig circuit is connected to the three microphone units 1a, 1b' and 1c. The illustrated combining circuit is the same in construction as that of FIG. 1, and therefore, description of the operation of the combining circuit is omitted. However, as will be described in detail hereinbelow, other arrangements of the combining circuit may be used instead.

Figure 4:
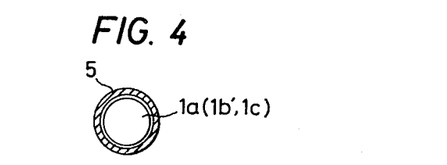
FIG. 4 is a schematic cross-sectional front view of the microphone unit casing of the variable directional microphone system of FIG. 3.

Since all of the microphone units 1a, 1b' and 1c are arranged on the same axis X, if the inner diameter of the casing 5 is as large as the outer diameter of the microphone unit 1a (1b' and 1c), all of the microphone units 1a, 1b' and 1c can be fitted in without difficulty as shown in FIG. 4. This means that the outer diameter of the casing 5 can be reduced to about half of the outer diameter of the casing 2 shown in FIG. 1, and thus the microphone system can be made compact and therefore, it is suitable as an attached microphone of a television camera or an eight-millimeter movie camera.

In the above arrangement, since the microphone units 1a and 1b' are arranged on the same axis X, the respective diaphragms thereof are not in the same plane; namely, they have to be spaced by a given distance expressed in terms of (D+ΔD−d). Owing to this fact it is impossible to obtain a theoretically accurate directivity pattern I having no distortion, and the nondirectivity assumes a directivity pattern II having a slight distortion as shown in FIG. 6. However, the microphone system can be treated as a nondirectional microphone system in a practical use. In addition, since the microphone unit 1b' is located at the rear of the microphone unit 1a, the entire length, i.e. the distnace between the front surfaces of the microphone units 1c anc 1b', is a little greater than the length D of FIG. 1 by ΔD. However, since the outer diameter of the casing 5 is about half of the outer diameter of the casing 2 of FIG. 1, the entire casing can be constructed compactly compared to that of FIG. 1.

Figure 5:
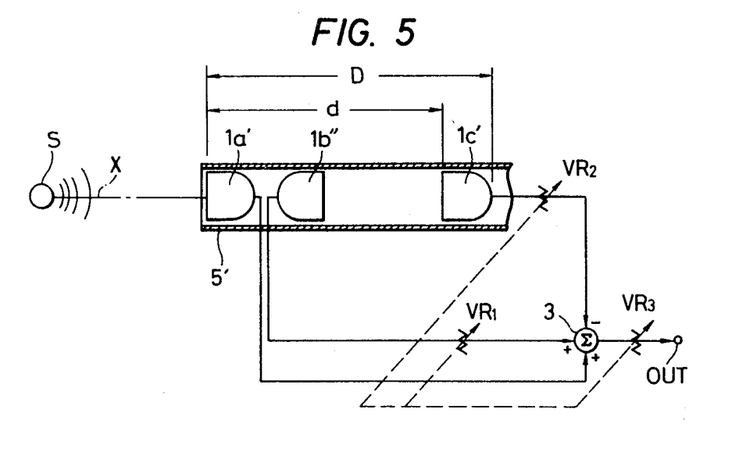
FIG. 5 is a schematic view of a second embodiment of the variable directional microphone system according to the present invention.

FIG. 5 is a schematic view of a second embodiment of the microphone system according to the present inveniton, and in FIG. 5, the same elements as in FIG. 1 are designated at the same numerals or the same references. In FIG. 5, microphone units 1a' and 1b" for obtaining nondirectivity are arranged in the front of a microphone unit 1c' on the same axis X extending toward the sound source S with a distance substantially the same as that of FIG. 3, and are fixed in a microphone casing 5'. Here, it is assumed that the outer diameters of the microphone units 1a' 1b" and 1c' are equal to each other. A combining circuit connected to the outputs of the microphone units 1a', 1b" and 1c' is the same as that of FIG. 1, and the operation thereof is the same, and therefore, description thereof is omitted.

Since all of the microphone units 1a', 1b" and 1c' are arranged on the same axis X, in the same manner as in FIG. 3, the outer diameter of the casing 5' can be reduced compared to that of FIG. 1. On the other hand, the distance between the respective diaphragms of the microphone units 1a' and 1c' is made equal to d, and the microphone unit 1b" is located between the microphone units 1a' and 1c'. As a result, the entire length can be made further smaller than that of FIG. 3; namely, the entire length can be equal to the distance D of FIG. 1.

It is possible to use only the microphone units 1a and 1b' of FIG. 3, or only the microphones 1a' and 1b" of FIG. 5, where the mixing ratio of the outputs thereof is changed to exhibit from nondirectivity to first order unidirectivity.

Furthermore, the circuit between the microphone unit 1c of FIG. 3 and the combiner 3 or between the microphone 1c' of FIG. 5 and the combiner 3 may be constructed of a phase shift circuit and a variable resistor, a variable high-pass filter, a high-pass filter and a variable resistor, or a variable phase shift circuit as will be described hereinbelow.

As described in the above, when only the microphone units 1a and 1c are used, namely, when the resistance of the first variable rsistor VR1 is set to the maximum and the resistance of the second variable resistor VR2 is set to the minimum, the variable directional microphone system of FIG. 3 or FIG. 5 exhibits second order unidirectivity. However, when the output signals of the two microphone units 1a and 1c are simply combined by the combiner 3, the combined output signal has a frequency characteristic which drops at 6 dB/OCT in a low frequency range as will be mathematically expresed hereinbelow. Therefore, in a conventional second order unidirectional microphone system, whose directivity is fixed, it is required to employ an equalizer to raise the level of the combined ouput signal at the low frequency range so that the frequency characteristic curve is substantially flat. Namely, as will be described in the sequel, since the low frequency range signal level is greatly amplified by the equalizer, noise level at the low frequency range increases, while the microphone system is poor at wind noises. Furthermore, it is necessary that the frequency characteristics and directivities of the two unidirectional microphone units 1a and 1c are uniform in order to obtain desired second order sound pressure gradient unidirectivity also in the low frequency range, and this tendency is strong in the low frequency range.

The above-described disadvantages inherent to the conventional second order unidirectional microphone system will be further described with reference to FIG. 7 for a better understanding of a feature of the present invention.

Figure 7:
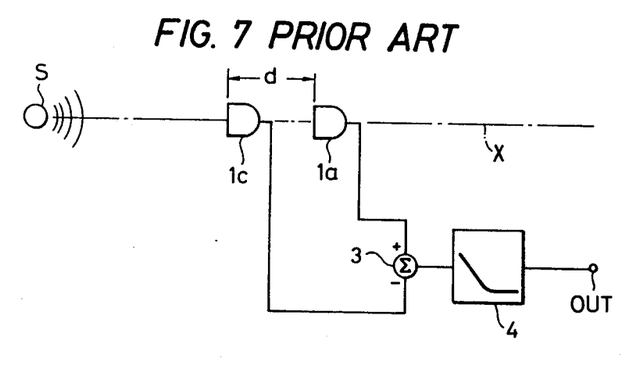
FIG. 7 is a schematic block diagram of a conventional second order sound pressure gradient unidirectional microphone system.

A conventional second order sound pressure gradient unidirectional microphone system is shown in FIG. 7 in the form of a schematic block diagram, and microphone units 1c and 1a having unidirectivity are arranged with a given distance d in such a manner that the center axes of the microphone units 1c and 1a are directed to a sound source S. Although a casing is not shown, a suitable casing having front and rear portions at both sides is actually provided in the same manner as in the previous embodiments. These microphone units 1c and 1a have to be selected so that the sensitivities, frequency characteristics and directivities thereof accord with each other accurately. The distance d between the microphone units 1c and 1a will determine the operating range of the second order sound pressure gradient unidirectional microphone system, and as will be described hereinlater, a dip in a frequency characteristic curve occurs at a frequency whose wavelength equals this spacing d.

The outputs of the above-mentioned microphone units 1c and 1a are connected to a combiner, i.e. a subtractor 3. The output of the subtractor 3 assumes a characteristic, as shown in a frequency characteristic of FIG. 10, that the gain has a slope falling by 6 dB per octave as the frequency lowers in a low frequency range. On the other hand, in a high frequency range, a dip occurs in the characteristic, as described in the 5 above, at a frequency of a sound whose wavelength equals the distance d between the microphone units 1c and 1a.

Figure 8:
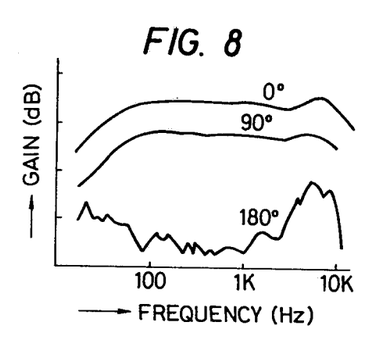
FIG. 8 is a graphical representation of frequency characteristics of a unidirectional microphone unit.
Figure 9:
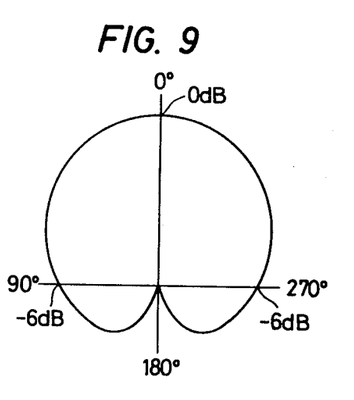
FIG. 9 is a typical directivity pattern of a unidirectional microphone unit.
Figure 10:
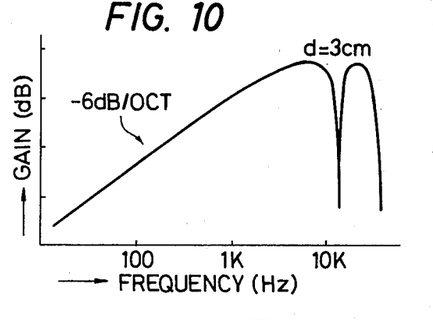
FIG. 10 is a graphical representation of a frequency characteristic of the output signal of the combiner of FIG. 7.

Accordingly, in order to correct the characteristic of the signal passed through the subtractor 3 to a flat one, it is necessary to make the combined signal pass through an equalizer 4 having a reverse characteristic with respect to the characteristic curve of FIG. 10. With the output signal passed through the equalizer 4, a frequency characteristic, which is similar to those of the above-mentioned microphone units 1c and 1a shown in FIG. 8, can be obtained. The characteristic, in which the direction of the axis X extends toward the sound source S (see zero degree curve, is applicable to the equalized system) in a frequency range below the upper limit which is determined by the wavelength corresponding to the distance d between the above-mentioned microphone units 1c and 1a. FIG. 8 shows typical frequency characteristics of an individual microphone unit which constitutes a second order sound pressure gradient unidirectional microphone system, and FIG. 9 shows a directivity of a first order sound pressure gradient unidirectional microphone unit.

The above-described phenomenon are expressed by a mathematical formula as follows:

$$E = \left(\frac{1 + \cos\theta}{2}\right) \cdot e^{j\omega t} \cdot (1 - e^{-jKd\cos\theta}) \quad (1)$$

wherein
E is an output of a second order sound pressure gradient unidirectional microphone system;
$\theta$ is an angle between the center axis of the microphone system and an axis extending toward a sound source;
$\omega$ is an angular frequency of the sound waves;
K is a wavelength constant;
d is a distance between the microphone units 1c and 1a; and
e is a base of natural logarithm.

In the above, it has been assumed that both the microphone units 1c and 1a have equal sensitivieies and directivities (unidirectivities).

Namely, FIG. 10 shows the frequency characteristic of the output E calculated by using the above formula (1), i.e. the frequency characteristic of the output signal of the subtractor 3 shown in FIG. 7.

Figure 11:
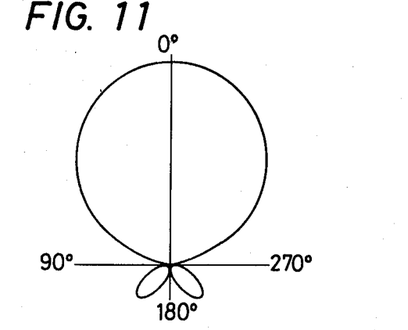
FIG. 11 is a directivity pattern of a general second order sound pressure gradient unidirectional microphone system including a conventional one and one according to the present invention.

FIG. 11 shows a typical directivity of a conventional second order sound pressure gradient unidirectional microphone system at a given frequency.

As described in the above, in a conventional second order sound pressure gradient unidirectional microphone system, an equalizer 4, in which the gain increases toward the lower frequency range by 6 dB per octave, is needed as shown in FIG. 7 to correct the output gain slope which lowers by 6 dB per octave toward the lower frequency range. In the system, the output is obtained by subtracting the output signal of the one microphone unit 1c from the output signal of the other microphone unit 1a to actualize second order sound pressure gradient directivity. As a result, for instance, when considering the operating range of 6 KHz or so, the amount of correction required for the equalizer 4 is over 20 dB in the vicinity of 100 harmful effects, such a deterioration of the S/N of the microphone system and/or the system is poor at wind noises, occur.

Figure 12:
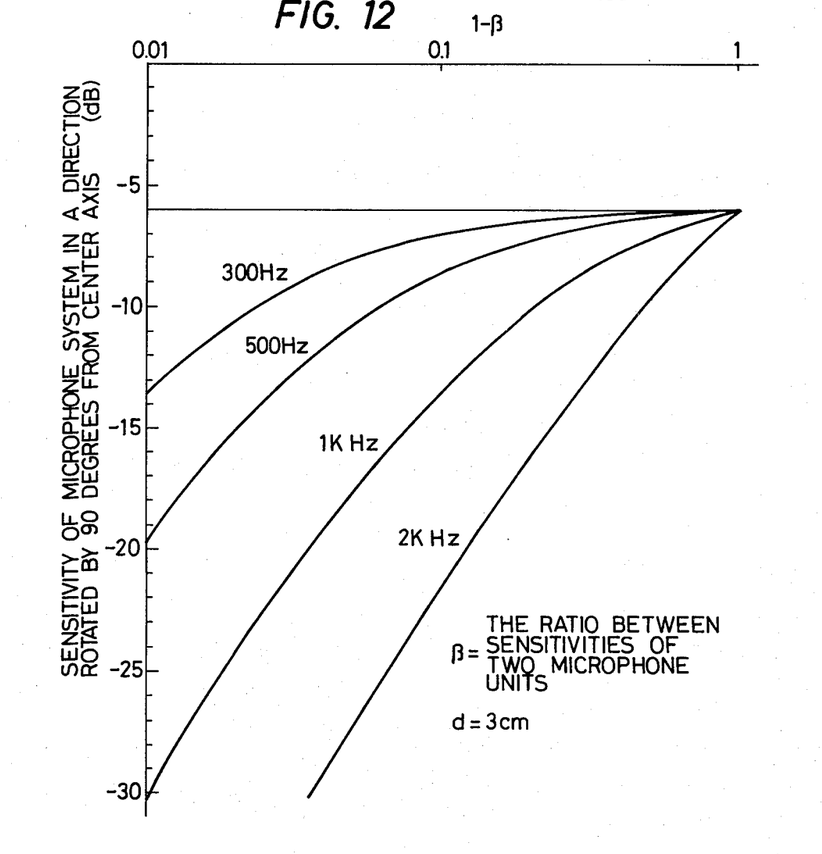
FIG. 12 is a graphical representation showing the ratio between the sensitivities of the two microphone units used for obtaining second order sound pressure gradient unidirectivity vs the sensitivity of the conventional second order sound pressure gradient unidirectional microphone system in a direction perpendicular to the center axis of the microphone system.

FIG. 12 is a graphical representation showing the ratio between the sensitivities of the two microphone units 1c and 1a constituting the second order sound pressure gradient unidirectional microphone system vs the sensitivity of the conventional second order sound pressure gradient unidirectional microphone system in a direction perpendicular (90 degrees) to the center axis of the microphone system. The abscissa of the graph is $1-\beta$, where $\beta$ is the ratio between the sensitivities of the two microphone units, and the ordinate is sensitivity of the microphone system in a direction rotated by 90 degrees from the center axis with respect to the sensitivity of the same in 0 degree direction.

What is meant by the graph of FIG. 12 is that a slight difference between microphone unit sensitivities causes the sharpness of directivity of the microphone system to deteriorate in the low frequency range on the contrary to the fact that in the high frequency range, the directivity of the microphone system is not very much affected by such difference between sensitivities of respective microphone units 1c and 1a.

From the above, it will be understood that if the band width in the low frequency operating range is not limited as in the conventional system, selection of each microphone unit with respect to sensitivities has to be done very severely so that two microphone units having substantially the same sensitivities are used for constituting a desired second order sound pressure gradient unidirectional microphone system whose directivity is very sharp. For this reason, a conventional second order sound pressure gradient unidirectional microphone system was high in manufacturing cost.

The present invention, therefore, also provides a second order sound pressure gradient unidirectional microphone system which does not suffer from the disadvantages inherent to the conventional system. To this end, the band width in the low operating frequency range is limited. The detailed structure of the second order sound pressure gradient unidirectional microphone system according to the present invention will be described hereinbelow.

Figure 13:
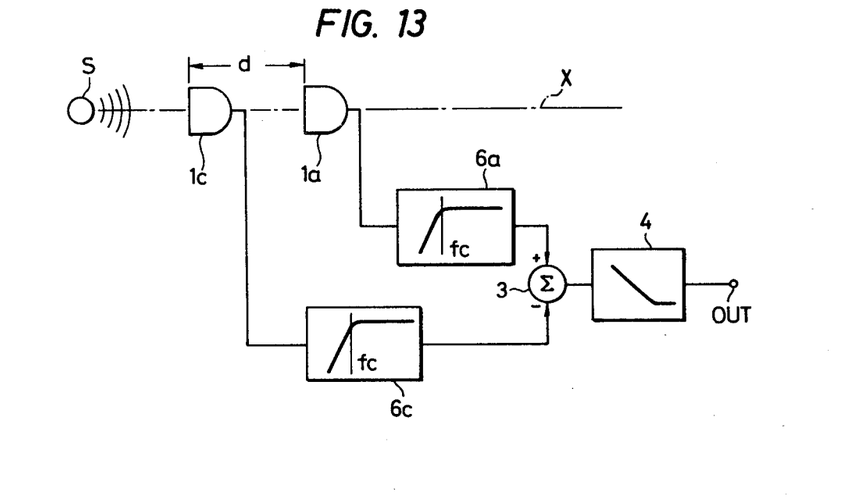
FIG. 13 is a schematic block diagram of an embodiment of the second order sound pressure gradient unidirectional microphone system according to the present invention.

FIG. 13 shows a block diagram of an embodiment of the second order sound pressure gradient unidirectional microphone system according to the present invention. The system of FIG. 13 differs from the conventional example of FIG. 7 in that high pass filters 6a and 6c having equal cut off frequencies fc and characteristics are inserted in the output circuits of the microphone units 1c and 1a, and the outputs passed through the high pass filters 6a and 6c are processed by means of a subtractor 3 to perform subtraction.

Figure 14:
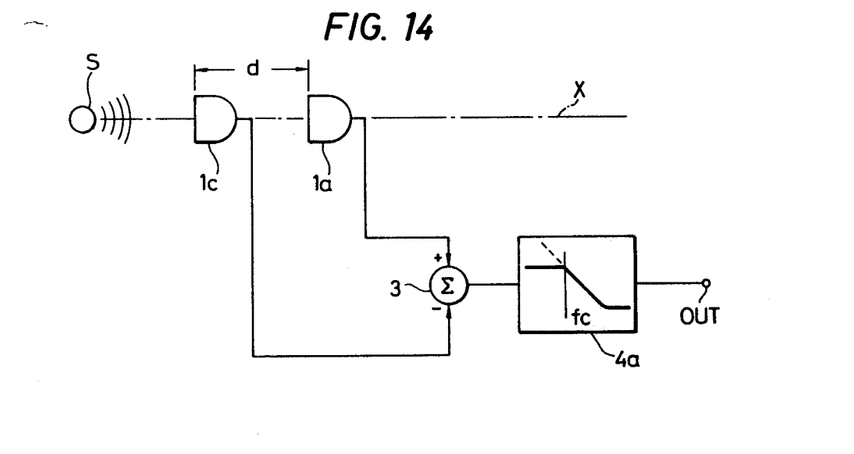
FIG. 14 is a schematic block diagram of another embodiment of the second order sound pressure gradient unidirectional microphone system according to the present invention.

FIG. 14 shows a block diagram of a second embodiment of the second order sound pressure gradient unidirectional microphone system according to the present invention. The system of FIG. 14 differs from that of FIG. 13 in that the high pass filters 6a and 6c following the output circuits of the microphone units 1c and 1a are omitted, while the equalizer 4a following the subtractor 3 is arranged to have a modified frequency characteristic. Namely, although the gain curve, in the middle frequency range, linearly rises toward the low frequency range, the gain is kept constant in the low frequency range, which is below the cut off frequency fc of the above-mentioned high pass filters 6a and 6c of FIG. 13.

Figure 15:
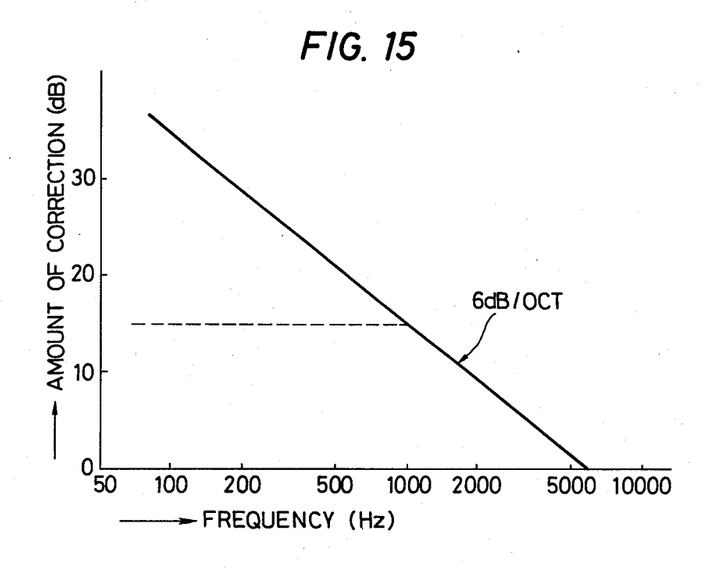
FIG. 15 is a graphical representation of the frequency characteristic of the equalizer of FIG. 13, and the frequency characteristic of the equalizer of FIG. 14.

In the second order sound pressure gradient unidirectional microphone system of the present invention, the system is prevented from being deteriorated with respect to S/N and wind noises at low frequencies by reducing the correction amount of the equalizer 4 or 4a to the utmost by limiting the operating band width in the low frequency range. FIG. 15 shows an example of a characteristic of the equalizer 4 for an arrangement wherein the distance d between the microphone units 1c and 1a equals 3 centimeters. The solid line is the frequency characteristic of the equilizer 4, and the broken line is that of the equalizer 4a. According to this example, it is represented that correction of 34 dB is necessary at 100 Hz with respect to a signal of 6 KHz assuming that the operating range is extended to 100 Hz.

On the other hand, if it is assumed that the lower limit of the operating range is 800 Hz, only 17 dB correction is necessary. Namely, when the operating range is limited, the above-mentioned drawbacks can be removed. Although this operating range (from 800 Hz to 10 KHz) is insufficient for hi-fi use, it is a sufficient range as a microphone system used for a tape recorder for recording conversations in conference or the like, or for a tape recorder used as a memorandum.

In addition, there is a great advantage because the operating range of the low frequency range can be limited. Namely, it is necessary to face the fact that variations in various characteristic are known to occur among a plurality of similarly manufactured microphone units. However, it is necessary that the frequency characteristics and directivities of the two unidirectional microphone units 1c and 1a be substantially equal to each other in order to provide a desired second order unidirectional microphone system.

Turning back to FIG. 12, as described hereinbefore, a slight difference between sensitivities of the two microphone units 1c and 1a causes the entire microphone system to undergo deterioration in the sharpness of directivity. For instance, if there is a difference of 10 percent, such a difference causes the directivity to deteriorate very much in the lower frequency range compared to the higher frequency range. Accordingly, in manufacturing, adjustment of various characteristics of the microphone units must be done precisely as the operating range is widened toward the low frequency range, resulting in high cost of manufacture. Therefore, the adjustment of the characteristic of the high pass filters (low cut filters) 6a and 6c of FIG. 13 or of the equalizer 4a of FIG. 14 is useful not only for preventing S/N of the second order sound pressure gradient unidirectional microphone system from being deteriorated and for preventing wind noises, but also for relaxing the tolerance of the variations of various characteristics of the unidirectional microphone units 1c and 1a in actual manufacturing. Therefore, improvement in productivity and cost reduction can be achieved.

Although in the above-described embodiment of FIG. 13, two high pass filters 6a and 6c are used, and in the embodiment of FIG. 14, the equalizer 4a having a modified frequency characteristic is used, other arrangements for preventing noises in the low frequency range will be described hereinbelow.

Figure 16:
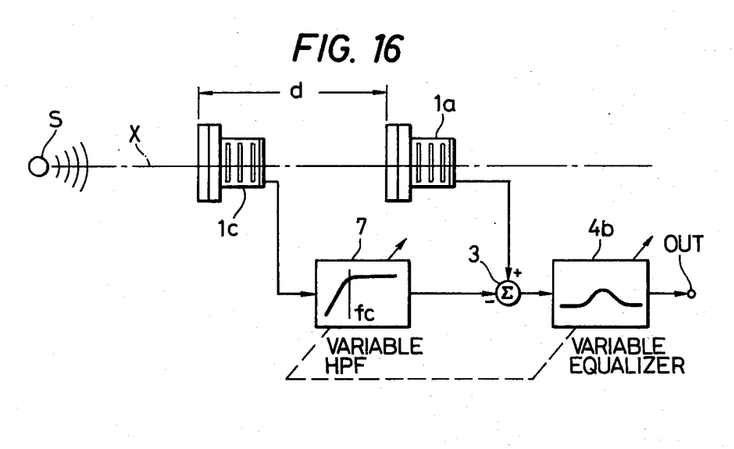
FIG. 16 is a schematic block diagram of another embodiment of the variable directional microphone system according to the present invention.

FIG. 16 shows another embodiment of the present invention, and in this embodiment, only one high pass filter 7 is employed. In detail, the high pass filter 7 is interposed between a microphone unit 1c and the negative terminal of the combiner 3, while the output terminal of the other microphone unit 1a is directly connected to the positive terminal of the combiner 3. The output terminal of the combiner 3 is connected to an equalizer 4b. The high pass filter 7 and the equalizer 4b are both of a variable type, and it is shown that variation in both the high pass filter 7 and in the equalizer 4b are controlled simultaneously by means of ganged variable resistors VR4 and VR5 respectively included therein.

Figure 17:
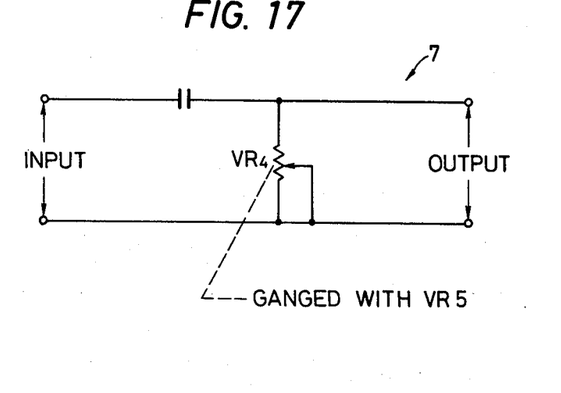
FIG. 17 is a circuit diagram of the variable high pass filter of FIG. 16.
Figure 18:
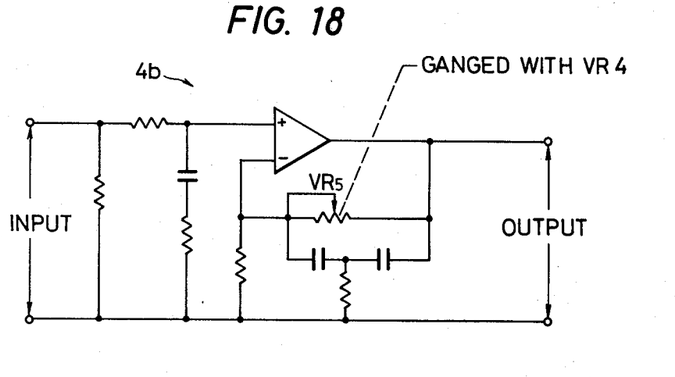
FIG. 18 is a circuit diagram of the variable equalizer of FIG. 16.

FIG. 17 and FIG. 18 respectively illustrate the circuit diagrams of the above-mentioned variable high pass filter 7 and the variable equalizer 4b.

The embodiment of FIG. 16 operates as follows: While the output signal of the microphone unit 1a is directly applied to the combiner 3 without being attenuated, the output signal of the other microphone unit 1c is applied via the variable high pass filter 7 to the combiner 3, where the cut off frequency fc of the high pass filter 7 is variable. Accordingly, the low frequency components of the output signal of the microphone unit 1c are attenuated before being combined with the output signal of the microphone 1a. As a result, the low frequency components of the microphone unit 1c are combined with low frequency components from the microphone unit 1a with opposite phase, while the high frequency components from the microphone unit 1c are combined with the high frequency components from the microphone unit 1a with opposite phase. Since components whose frequency is higher than the cut off frequency fc of the variable high pass filter 7 are combined with each other without being attenuated, the frequency characteristic of the combined signal at high frequencies is the same as that of the conventional arrangement of FIG. 7. On the contrary, since components, whose frequency is much lower than the cut off frequency of the variable high pass filter 7, are attenuated by the variable high pass filter 7, it is possible to treat the output signal of the combiner 3 as including only the output signal of the microphone 1a. Consequently, in the low frequency range, the output signal of the combiner 3 exhibits a substantially flat frequency characteristic in the same manner as in first order unidirectional microphone unit. Therefore, the output signal of the combiner 3 has a frequency characteristic such that the level of middle range frequency signal is lower than those of high and low frequencies by only 13 dB or so. This means that the degree of compensation by the equalizer 4b can be reduced to as low as 13 dB or so when compared to the conventional equalizer 4 of FIG. 7.

Figure 19:
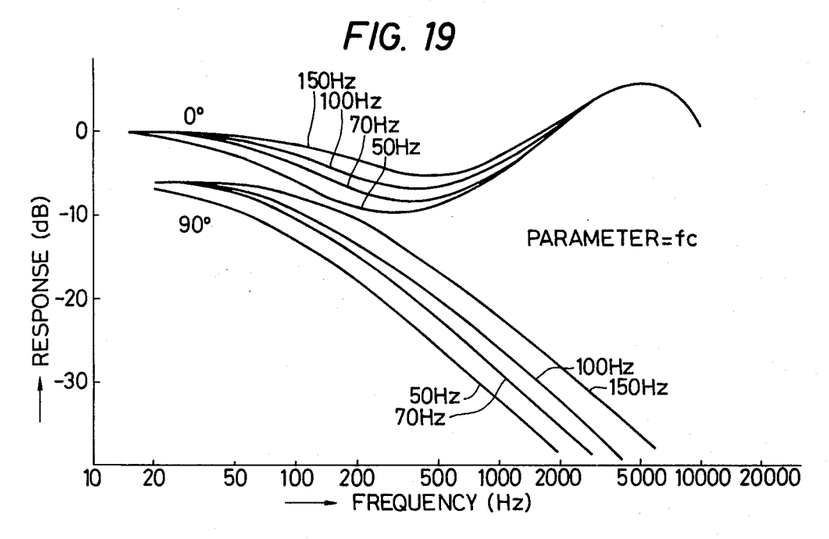
FIG. 19 is a graphical reprsentation showing frequency characteristics of the output signal of the combiner of FIG. 16, where the cut off frequency is varied in a relatively low frequency range.
Figure 20:
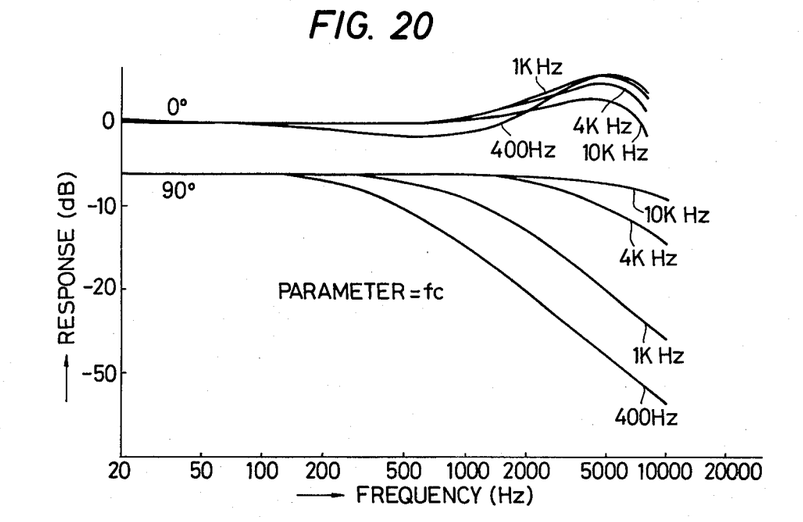
FIG. 20 is a graphical representation showing frequency characteristics of the output signal of the combiner of FIG. 16, where the cut off frequency is varied in a relatively high frequency range.

FIG. 19 and FIG. 20 respectively show the frequency characteristics of the combined output signal. In FIG. 19, curves obtained when the cut off frequency fc of the variable high pass filter 7 is changed from 50 to 150 Hz are shown, and in FIG. 20, curves obtained when the cut off frequency fc is changed from 400 Hz to 10 KHz are shown. In both FIGS. 19 and 20, the upper curves are frequency characteristics in the case where the microphone system is oriented toward the sound source S, and the lower curves are frquency characteristics in the case where the microphone system has been rotated from the axis to the sound source S by 90 degrees.

The variable equalizer 4b is arranged to have a characteristic which is opposite to the characteristic of the output signal of the combiner 3. Namely, the frequency characteristic of the equalizer 4b is changed by the variable resistor VR5 which is ganged with the variable resistor VR4 of the high pass filter 7, so that a substantially flat curve is obtained at the output terminal of the equilizer 7. Although in the above-described embodiment of FIGS. 16 to 20, the high pass filter 7 and the equalizer 4b are both variable type, a high pass filter and an equalizer of both fixed type may be used instead if desired. Furthermore, although the combining ratio is not changed in the above embodiment, the combining ratio of the output signals of the two microphone units 1a and 1c may be changed. In detail, a variable resistor may be interposed between a fixed high pass filter and the combiner 3, while a variable equalizer is arranged to be responsive to the output signal of the combiner 3. The variable resistor arranged between the high pass filter and the combiner 3 may be ganged with the variable resistor of the variable equalizer.

Figure 21:
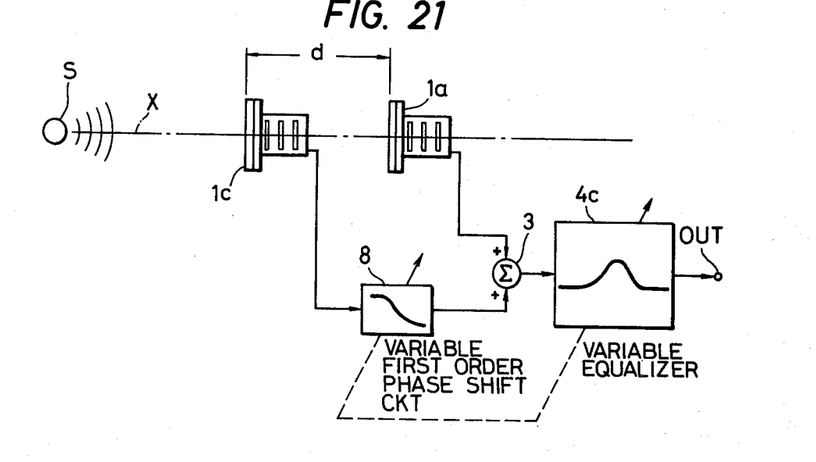
FIG. 21 is a schematic block diagram of another embodiment of the variable directional microphone system according to the present invention.
Figure 22:
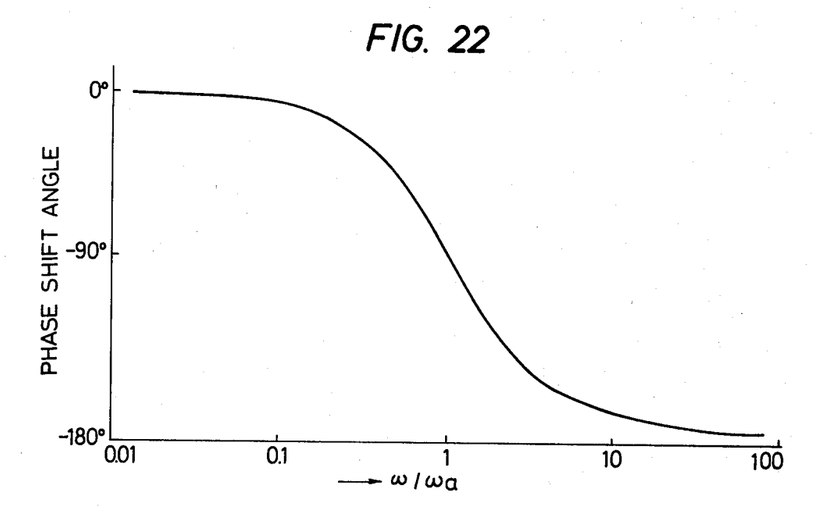
FIG. 22 is a graphical representation showing the phase shifting which is performed in the arrangement of FIG. 21.

FIG. 21 shows another modification in which a variable first order phase shift circuit 8 is used in place of the variable high pass filter 7 of FIG. 16. The phase shift circuit 8 has a characteristic as shown in FIG. 22. Namely, when the frequency of the input signal of the phase shift circuit 8 is above a given frequency, the phase of the input signal is greatly shifted, i.e. retarded by more than 90 degrees, and on the other hand when the frequency of the input signal is below the given frequency, the phase of the input signal is not shifted by more than 90 degrees. If the frequency is very high, the phase thereof is substantially shifted by 180 degrees, and if the frequency is very low, the phase thereof is hardly shifted. In the graph of FIG. 22 the abscissa shows $\omega/\omega a$, that is the ratio of an angular frequency $\omega$ of an input signal of the variable phase shift circuit 8 to an angular frequency $\omega a$ of the above-mentioned given frequency. In the arrangement of FIG. 21, the combiner 3 is arranged to function as an adder rather than as a subtractor. In other words, both the output terminals of the variable phase shift circuit 8 and the microphone unit 1a are respectively connected to positive input terminals of the combiner 3.

Figure 23:
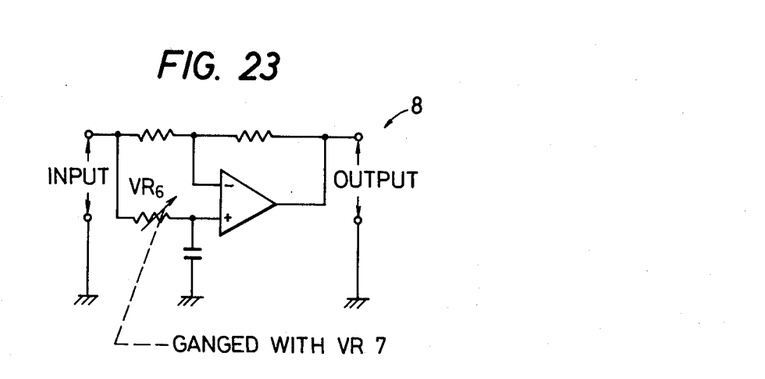
FIG. 23 is a circuit diagram of the variable phase shift circuit of FIG. 21.
Figure 24:
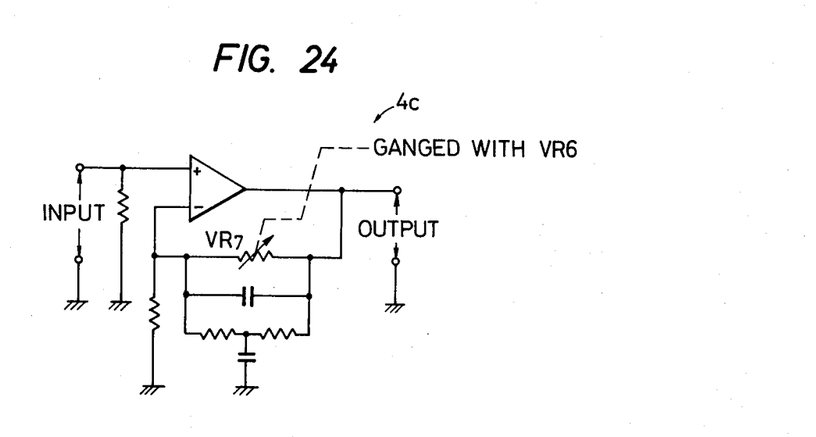
FIG. 24 is a circuit diagram of the variable equalizer of FIG. 21.

Accordingly, high frequency components from the microphone unit 1c are combined with the output signal of the microphone unit 1a after the phase of the high frequency components are shift or rotated by substantially 180 degrees. This means that the output signal of the microphone unit 1c is subtracted from the output signal of the microphone unit 1a at high frequencies. On the other hand, the low frequency components of the output signal of the microphone unit 1c are combined with the output signal of the other microphone unit 1a without being shifted. Accordingly, the output signal of the combiner 3 assumes a frequency characteristic similar to that shown in FIGS. 19 and 20. Namely, the level of the low frequency components of the output signal of the combiner 3 is substantially the same as that of high frequency components although the level of middle frequency components is slightly lower than those of high and low frequency components. Therefore, an equalizer 4c which follows the combiner 3 is not required to raise the low frequency level greatly. Namely, the equalizer 4c is simply required to raise the middle frequency signal level in an opposite manner to the frequency characteristic of the output signals of the combiner 3. FIG. 23 shows the variable phase shift circuit 8, while FIG. 24 illustrates a circuit diagram of the equalizer 4c shown in FIG. 21. Both the phase shift circuit 8 and the equalizer 4c are of variable type, and frequency variations in these circuits 8 and 4c are effected by variable resistors VR6 and VR7 respectively included in these circuits 8 and 4c. The variable resistors VR6 and VR7 are ganged as indicated by broken lines in FIGS. 21, 23 and 24.

If desired, however, a fixed phase shift circuit and a fixed equalizer may be used in place of the above-mentioned variable circuits 8 and 4c. Although in the above, it has been described that the phase shift cirucit 8 is of first order type, a second order variable or fixed phase shift circuit may be used in place of such a first order phase shift circuit 6.

The above-described embodiments are just examples of the present invention, and therefore, it will be apparent to those skilled in the art that many modifications and variations may be made without departing from the spirit of the invention.

What is claimed is:

1. A variable directional microphone system comprising:
   (a) a casing having front and rear portions, said casing being arranged to allow sound waves from all directions to pass therethrough;
   (b) a first first order sound pressure gradient unidirectional type microphone unit having a front and a rear, said first microphone unit disposed in said casing in such a direction that the front of said first microphone unit is oriented toward said front portion of said casing;
   (c) a second first order sound pressure gradient unidirectional type microphone unit having a front and a rear, said second microphone unit disposed in said casing in such a direction that the front of said second microphone unit is oriented toward said rear portion of said casing, said second microphone unit being arranged in such a manner that the rear of said second microphone unit faces the rear of said first microphone unit, said first and second microphone units respectively having first and second center axes which respectively pass through centers of the fronts and rears of said first and second microphone units, said first and second axes being aligned on a common axis; and
   (d) means for combining the output signals of said first and second microphone units at a variable ratio.

2. A variable direction microphone system as claimed in claim 1 wherein said means for combining the output signals is operable for changing a directional response of the microphone system from a substantially omnidirectional response to a unidirectional response.

3. A variable directional microphone system as claimed in claim 1, wherein said casing comprises a cylindrical bore the inner diameter of which is slightly greater than the outer diameter of said first and second microphone units.

4. A variable directional microphone system as claimed in claim 1, wherein said means for combining the output signals of said first and second microphone units comprises an adder having two input terminals, and a variable resistor interposed between one of said microphone units and one of said two input terminals of said adder.

5. A variable directional microphone system as claimed in claim 3, further comprising a second variable resistor connected to an output terminal of said adder.

6. A variable directional microphone system as claimed in claim 4, wherein said variable resistor connected between said one of said microphone units and said one of said input terminals of said adder, and said second variable resistor are ganged.

7. A variable directional microphone system comprising:
 (a) a casing having front and rear portions, said casing being arranged to allow sound waves from all directions to pass therethrough;
 (b) a first microphone unit of first order sound pressure gradient unidirectional type, said first microphone unit having a front and a rear, said first microphone unit disposed in said casing in such a direction that the front of said first microphone unit is oriented toward said front portion of said casing;
 (c) a second microphone unit of first order sound pressure gradient unidirectional type, said second microphone unit having a front and a rear, said second microphone unit disposed in said casing in such a direction that the front of said second microphone unit is oriented toward said rear portion of said casing, said second microphone unit being arranged in such a manner that the rear of said second microphone unit faces the rear of said first microphone unit;
 (d) a third microphone unit of first order sound pressure gradient unidirectional type, said third microphone unit having a front and a rear, said third microphone unit disposed in said casing in such a direction that the front of said third microphone unit is oriented toward said front portion, said first, second and third microphone units respectively having first, second and third axes which respectively pass through centers of the fronts and rears of said first, second and third microphone units, said first, second and third axes being aligned on a common axis; and
 (e) means for combining the output signals of said first, second and third microphone units at a variable ratio.

8. A variable directional microphone system as claimed in claim 7 wherein said means for combining the output signals is operable for changing a directional response of the microphone system from a substantially omnidirectional response to a higher order unidirectional response.

9. A variable directional microphone system as claimed in claim 7, wherein said casing comprises a cylindrical bore the inner diameter of which is slightly greater than the outer diameter of said first, second and third microphone units.

10. A variable directional microphone system as claimed in claim 7, wherein said means for combining the output signals of said first, second and third microphone units comprises an adder having two positive input terminals and one negative input terminal, a first variable resistor interposed between said second microphone unit and one of said two positive input terminals of said adder, and a second variable resistor interposed between said third microphone unit and said negative input terminal of said adder, the other positive input terminal being connected to said first microphone unit.

11. A variable directional microphone system as claimed in claim 10, further comprising a third variable resistor connected to an output terminal of said adder.

12. A variable directional microphone system as claimed in claim 11, wherein said first, second and third variable resistors are ganged.

13. A variable directional microphone system as claimed in claim 7, wherein said third microphone unit is located closer to said front portion of said casing than are said first and second microphone units, and is spaced by a given distance from said first microphone unit.

14. A variable directional microphone system as claimed in claim 7, wherein said third microphone unit is located closer to said rear portion of said casing than are said first and second microphone units, and is spaced by a given distance from said first microphone unit.

15. A variable directional microphone system as claimed in claim 7, further comprising two high pass filters respectively interposed between said first microphone unit and said means for combining, and between said third microphone unit and said means for combining; and an equalizer responsive to an output signal of said means for combining, said equalizer having a frequency characteristic so that the level of low frequency components of the combined signal is raised at a given rate per octave.

16. A variable directional microphone system as claimed in claim 7, further comprising an equalizer responsive to an output signal of said means for combining, said equalizer having a frequency characteristic so that the level of low frequency components of the combined signal is raised by a constant amount, and the level of middle frequency components of the combined signal is raised at a given rate per octave.

17. A second order sound pressure gradient unidirectional microphone system comprising:
 (a) a casing having front and rear portions, said casing being arranged to allow sound waves from all directions to pass therethrough;
 (b) a first microphone unit of first order sound pressure gradient unidirectional type, said first microphone unit having a front and a rear, said first microphone unit disposed in said casing in such a direction that the front of said first microphone unit is oriented toward said front portion of said casing;
 (c) a second microphone unit of first order sound pressure gradient unidirectional type, said second microphone unit having a front and a rear, said second microphone unit disposed in said casing in such a direction that the front of said second microphone unit is oriented toward said front portion of said casing, said second microphone unit being located in the rear of said first microphone unit;
 (d) means for combining the output signals of said first and second microphone units at a given ratio to produce an output signal;
 (e) first and second high pass filters respectively interposed between said first and second microphone units and said means for combining; and
 (f) an equalizer responsive to the output signal of said means for combining, said equalizer having a frequency characteristics so that the level of low frequency components of the combined signal is raised at a given rate per octave.

18. A second order sound pressure gradient unidirectional microphone system comprising:
 (a) a casing having front and rear portions, said casing being arranged to allow sound waves from all directions to pass therethrough;
 (b) a first microphone unit of first order sound pressure gradient unidirectional type, said first microphone unit having a front and a rear, said first microphone unit disposed in said casing in such a direction that the front of said first microphone unit is oriented toward said front portion of said casing;

(c) a second microphone unit of first order sound pressure gradient unidirectional type, said second microphone unit having a front and a rear, said second microphone unit disposed in said casing in such a direction that the front of said second microphone unit is oriented toward said front portion of said casing, said second microphone unit being located in the rear of said first microphone unit;

(d) means for combining the output signals of said first and second microphone units at a given ratio; and (e) an equalizer responsive to an output signal of said means for combining, said equalizer having a frequency characteristics so that the level of low frequency components of the combined signal is raised by a constant amount, and the level of middle frequency components of the combined signal is raised at a given rate per octave.

* * * * *